United States Patent [19]

Nortrup et al.

[11] Patent Number: 4,626,892
[45] Date of Patent: Dec. 2, 1986

[54] TELEVISION SYSTEM WITH MENU LIKE FUNCTION CONTROL SELECTION

[75] Inventors: Kevin E. Nortrup, Indianapolis; Billy W. Beyers, Jr., Greenfield; Jack S. Fuhrer, Carmel, all of Ind.

[73] Assignee: RCA Corporation, Princeton, N.J.

[21] Appl. No.: 586,271

[22] Filed: Mar. 5, 1984

[51] Int. Cl.⁴ .............................................. H04N 5/44
[52] U.S. Cl. .................................. 358/21 R; 358/22; 358/188
[58] Field of Search .............. 358/21 R, 22, 183, 188, 358/194.1

[56] References Cited

U.S. PATENT DOCUMENTS

| | | | |
|---|---|---|---|
| 3,953,801 | 4/1976 | Podowski | 325/464 |
| 4,270,145 | 5/1981 | Farina | 358/188 |
| 4,344,090 | 8/1982 | Belisomi | 358/22 |
| 4,519,003 | 5/1985 | Scholz | 358/335 |

FOREIGN PATENT DOCUMENTS

| | | | |
|---|---|---|---|
| 0120345 | 10/1984 | European Pat. Off. | 358/194.1 |
| 48-74988 | 10/1973 | Japan . | |
| 52-118190 | 4/1977 | Japan . | |

OTHER PUBLICATIONS

Colour-TV Set with Microprocessor Control, Baum, Funkschan, vol. 49, No. 17, (Aug. 12, 1977) pp. 763-768.

For Remote Controlled High Quality Color TV Set, Siemens Components XV (1980) No. 5, pp. 260-261.
Pp. 1-22, 2-18, 2-27, 2-34 and 5-3 from the "IBM Personal Computer XT Hardware Reference Library--Guide to Operations" published by IBM in 1983.
U.S. patent application Ser. No. 671,205 filed Mar. 29, 1976.
A pamphlet describing a viewdata service known under the trademark of Prestel.
U.S. patent application Ser. No. 586,270 filed Mar. 5, 1984.

*Primary Examiner*—Michael A. Masinick
*Attorney, Agent, or Firm*—Eugene M. Whitacre; Paul J. Rasmussen; Peter M. Emanuel

[57] ABSTRACT

Apparatus for controlling various functions of a television receiver such as the picture and audio responses includes a keyboard with numbered keys which are normally used for selecting channels and a program key. When the program key is pressed, an on-screen character generator is caused to display a numbered list or menu of the various functions to be controlled. Thereafter, a particular function can be selected for control by pressing the correspondingly numbered key. This causes the numbered list or menu of the characteristics of the selected function, e.g., the brightness, contrast, sharpness, color level and color tint of the picture, to be displayed. Thereafter a particular characteristic can be selected for control by pressing the correspondingly numbered key.

22 Claims, 18 Drawing Figures

TELEVISION SYSTEM WITH MENU LIKE FUNCTION CONTROL SELECTION

The present invention concerns a television system with apparatus for controlling a relatively large number of functions and characteristics with only a relatively small number of control devices.

Television receivers have a relatively large number of functions that are controllable by the user. Typically, these include turning the receiver on and off, selecting channels, setting the volume level and adjusting certain picture characteristics such as brightness, contrast sharpness (sometimes called "peaking"), color level (or saturation) and color tint (or hue) and in television receivers with stereo sound provisions, adjusting certain audio characters such as balance, treble and bass. In addition, with the increased use of digital signal processing and microprocessors, a large number of other control functions have become economically practical. Often a control device is provided for each function or characteristic.

In the case of television receivers with analog signal processing systems, potentiometers are provided for adjusting respective picture and audio characteristics in both increasing and decreasing senses. However, in television receivers with digital signal processing systems it is anticipated that each of these potentiometers may be replaced by two pushbutton switches for digitally causing the respective characteristic to be increased or decreased. Therefore it is anticipated that a digital television receiver will require even more control devices than a comparable analog receiver.

It is desirable for cost and for human engineering reasons to limit the number of user operable control devices. Thus, there has been the desire to provide control apparatus for controlling a large number of functions and characteristics of a television receiver with only a few control devices.

In the past, attempts to make multiple use of switches for controlling various functions in order to limit the number of control devices have been confusing to users. Thus, there exists a need for plural-function and characteristic control apparatus in which multiple use is made of control devices with little or no confusion to users.

In accordance with a feature of the present invention, in a television system, a programming switch and a plurality of switches identified by respective symbols such as numbers, the latter being normally used for channel or television signal source selection, are used to select various functions of a receiver for control. When the programming switch is operated by a user, a character generator produces signals for displaying a list or menu of various receiver control functions, such as the controlling of the picture and audio responses on an image reproducing device associated with the television system. In the menu, each one of the functions is identified by one of the symbols associated with the signal source selection switches. Thereafter, a particular one of the functions displayed on the menu can be selected for control by operation of the corresponding signal source selection switch.

In accordance with another aspect of the invention, after a particular function has been selected for control, a list or menu of characteristics of the selected function, such as brightness, contrast, sharpness, color level and color tint characteristics of the picture response is caused to be displayed. In the menu, each of the functions is identified by one of the symbols associated with the signal source selection switches. Thereafter, a particular one of the characteristics displayed on the menu can be selected for adjustment by operation of the corresponding signal source selection switch. After a characteristic has been selected for control, positive and negative sense adjustment switches common to all the characteristics can be operated to adjust the selected characteristic.

These and other aspects of the present invention will be described with reference to the accompanying Drawings in which.

Figure 1:
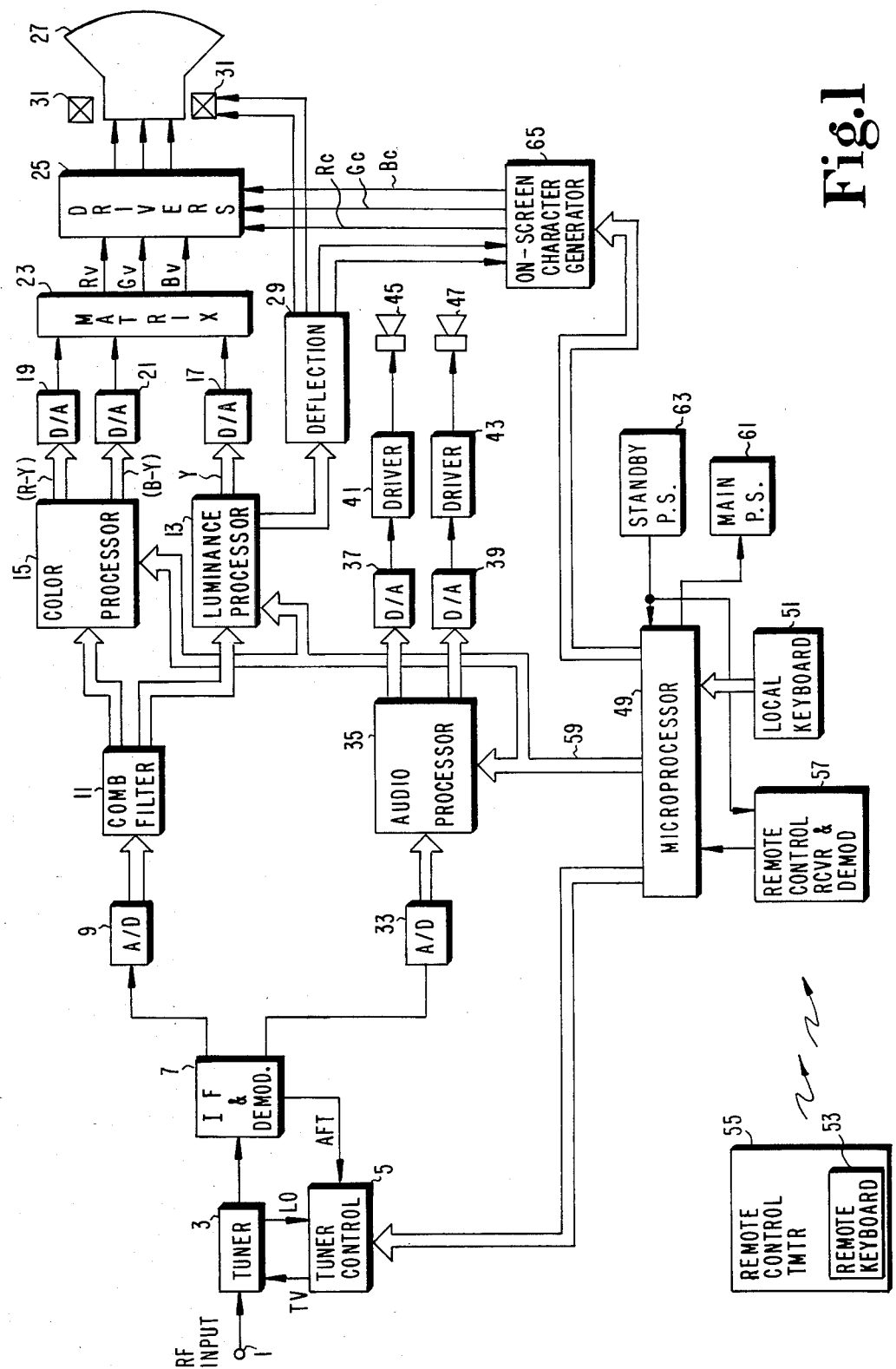
FIG. 1 is a schematic in block form of a television receiver with control apparatus constructed in accordance with the present invention.

As shown in FIG. 1, RF signals provided at an RF input 1 are coupled to a tuner 3 which selects the particular RF signal corresponding to a selected channel and converts it to an IF signal. Tuner 3 is controlled in response to the magnitude of a tuning voltage (TV) which in turn is set in accordance with the selected channel by a tuner control unit 5. An IF section 7 filters the IF signal and demodulates its video and audio components to produce respective baseband signals. The baseband signals are coupled to a digital signal processing section which performs various control functions of the receiver as will now be explained.

The video baseband signal is converted to digital samples by an analog-to-digital (A/D) converter 9 which are thereafter separated by a digital comb filter 11 into respective luminance and chrominance digital samples. The luminance and chrominance digital samples are processed by respective processing units 13 and 15. Luminance processing unit 13 controls the brightness, contrast and sharpness (or "peaking") characteristics of a reproduced image. Chrominance processing unit 15 controls the color level (or saturation) and color tint (or hue) characteristics of the reproduced image. The luminance (Y) samples produced at the output of luminance processing unit 13 and the color difference (R-Y and B-Y) samples produced at outputs of color processing unit 15 are converted to respective analog signals by digital-to-analog converters (A/D) 17, 19 and 21. The analog luminance and color difference signals are combined in an analog color matrix 23 to produce red, green and blue color signals ($R_y$, $G_y$ and $B_y$). The color signals are amplified by respective drivers 25 and resultant signals are coupled to respective electron guns of a picture tube 27.

A digital deflection unit 29 separates the synchronization components from the luminance samples and forms deflection signals which are applied to deflection coils 31 to deflect the electron beams produced by the electron guns of picture tube 27 in order to produce an image on its screen.

The audio baseband signal produced by IF section 7 is converted to digital samples by A/D 33. The digital audio samples are processed by a digital audio processing unit 35. Audio processing unit 35 separates the digital audio samples into left and right digital stereo digital samples when the received RF signal includes stereo components and otherwise produces left and right psuedo stereo digital samples. The digital stereo or psuedo stereo samples produced by audio processing unit 33 are converted into respective analog signals by D/A converters 37 and 39. The analog audio signals are amplified by drivers 41 and 43 and coupled to speakers 45 and 47 to produce respective audio responses. Audio processing unit 35 also controls the volume level, balance, treble and bass characteristics of the audio responses. Audio processing unit 35 may also be caused to temporarily inhibit, i.e., "mute" the audio responses.

The picture and audio processing functions described above are controlled by a microprocessor 49 in response to a user's operation of pushbutton switches on a local keyboard 51 attached to the television receiver itself or a remote keyboard 53 located on a remote control transmitter 55. When a user presses the key of a pushbutton switch on local keyboard 51, a digital word coded to correspond the particular pushbutton switch is directly coupled to microprocessor 49. When a user presses the key of a pushbutton switch on remote keyboard 53, a corresponding remote control message in the form of pulse code modulated infrared carrier is coupled to a remote control receiver 57. Remote control receiver 57 demodulates the infrared carrier and couples the remote control message, in serial form, to microprocessor 49. In response to pressing either a pushbutton switch on local keyboard 51 or on remote keyboard 53, microprocessor 49 generates a coded function control message which is coupled to luminance, color and audio processors 13, 15 and 35 to control their respective functions through a control bus 59. The control messages contains a preamble portion for identifying the particular processing unit and characteristic to be controlled and a data portion for setting the characteristic to a particular condition.

Microprocessor 49 also controls tuner control unit 5 to generate the tuning voltage having a magnitude set in accordance with the channel number of the desired channel also entered by means of pushbutton switches on local keyboard 51 or remote control keyboard 55. For that purpose, tuner control unit 5 may include a phase locked loop for causing the frequency of the tuner's local oscillator (LO) signal to be proportional to that of a crystal oscillator, the factor of proportionality being determined by the division factor of a programmable counter which is set in accordance with the channel number.

In addition, microprocessor 49 also causes a main power supply 61 to selectively provide operating voltages to various portions of the television receiver to place it in "on" or "off" states. A standby power supply 63 supplies operating voltage to remote control receiver and demodulator 57 and microprocessor 49 even when the receiver is in the off state so that they can process "on" commands.

Finally, in accordance with an aspect of the present invention, microprocessor 49 controls an "on-screen" character generator 65 to generate red, green and blue character signals ($R_c$, $G_c$ and $B_c$) which are coupled to drivers 25 so as to display instructions for guiding the user in controlling the various functions of the receiver in the manner to be described in detail below. Microprocessor 49 also controls character generator 65 in order to display the channel number and present time when a new channel is selected. The red, green and blue character signals ($R_c$, $G_c$ and $B_c$) are coupled to drivers 25 together with the red, green and blue video signals ($R_v$, $G_v$ and $B_v$) so that the function control instructions and channel number and present time are displayed together with the normal image. It is desirable to display the control instructions together with the normal image so that the picture characteristics of brightness, contrast, sharpness, color level and color tint can be readily adjusted. It is also desirable to display the control instructions together with the normal image so that the user does not have to interrupt viewing a program during the control of other functions. For purposes of synchronizing the instruction display with the normal image, horizontal and vertical synchronization signals produced by deflection unit 29 are coupled to character generator 65. The relative amplitude of the red, green and blue character signals is selected to produce the most visible instruction display on a variety of normal image backgrounds. It has been found that a redish-blue color is desirable for this purpose. The MB88303ES integrated circuit manufactured by Fijitsu of Japan is suitable for use as character generator 65.

The digital signal processing portion of the receiver so far described may comprise the DIGIT 2000 VLSI Digital TV System" recently introduced by the Worldwide Semiconductor Group of ITT, Freiburg, West Germany. That system includes integrated circuits which have functional correspondence to elements of the digital processing system shown in FIG. 1 as follows:

MAA 2000 Central Control Unit (CCU)—microprocessor 49

MAA 2100 Video Code Unit (VCU)—A/D 9, D/A's 17, 19 and 21

MAA 2210 NTSC Comb Filter Processor—comb filter 11

MAA 2200 Video Processor Unit (VPU)—luminance processor 13 and Chrominance Processor 15

MAA 2300 Audio A/D converter (ADC)—A/D 33

MAA 2400 Audio Processor Unit (APU)—audio processor 35 and D/As 37 and 39

MAA 2500 Deflection Processor Unit (DPU)—deflection unit 29

Figure 2:
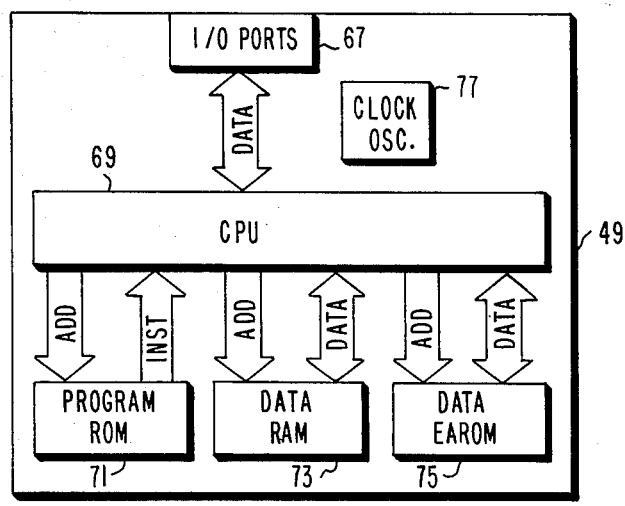
FIG. 2 is a schematic in block form of a microprocessor used in the control apparatus shown in FIG. 1.

Further details of the control functions of the television receiver shown in FIG. 1 will now be described with reference to the simplified block diagram of microprocessor 49 shown in FIG. 2. Microprocessor 49 includes input and output (I/O) ports 67 by which data is coupled to and from it. A central processing unit (CPU) 69 processes the data according to program instructions stored in a read-only memory (ROM) 71. A random-access memory (RAM) 73 is provided to temporarily store data which is being processed. An electronically alterable ROM (EAROM) 75 is used to permanently store data. Unlike RAM 73, ROM 71 and EAROM 75 are nonvolatile so that their contents are maintained in even the absence of supply voltage. Unlike ROM 71, the contents of EAROM 75 can be changed under program control. A clock oscillator 77 supplies various timing signals for microprocessor 49.

While tuner control unit 5 and remote control demodulator 57 have been shown as being external to microprocessor 49 for purposes of description, they may in practice be incorporated in microprocessor 49 as is the case in the ITT MAA2000 CCU.

EAROM 75 is used to store data for the various functions and characteristics of the receiver described above. EAROM 75 stores data for certain often-controlled functions including the:

on/off state;

channel number of the selected channel;
volume level; and
audio muting state.

For controlling the picture, EAROM 75 stores data for the following characteristics:
brightness;
contrast;
color level; and
color tint.

For controlling the audio response, EAROM 75 stores data for the following characteristics:
balance;
treble; and
bass.

EAROM 75 also stores data for setting the picture characteristics to preset levels from which the user may start to make adjustments or to which the user may return the receiver. Memory locations are provided for storing a set of preset levels for the picture characteristics entered by the manufacturer in the factory according to what the manufacturer considers an optimum picture and another set of preset levels for the picture characteristics may be entered by the user according to what the user considers an optimum picture. Specifically, EAROM 75 stores data for:
a factory preset brightness level;
a user preset brightness level;
a factory preset contrast level;
a user preset contrast level;
a factory preset color level;
a user preset color level;
a factory preset color tint; and
a user preset color tint.

In addition EAROM 75 may be used to store indications of certain states of the receiver which would in a conventional receiver be determined by the position of respective mechanical switches.

For example, many television receivers include apparatus for automatically setting the color tint to a predetermined condition. Specifically color processor 15 may include apparatus which automatically adjusts the phases of the digital color samples produced at its outputs so that they are aligned with respect to certain color reference angles, e.g., those corresponding to flesh tones to which the human eye is particularly sensitive. A switch is usually provided by which this "autotint" function may be defeated so as to permit the user to adjust tint according to his own preference.

Another state switch may be provided to allow a user to select between stereo and monaural sound reproduction modes of audio processor 35.

Still another state switch may be provided to activate and defeat a noise reduction arrangement of audio processor 35.

A state switch may also be provided to allow a user to select the mode of operation of tuner control unit 5. As earlier noted, tuner control unit 5 may include a phase locked loop which precisely locks the frequency of the local oscillator signal to that of a crystal oscillator. This is suitable for broadcasted RF signals which have very precise and predictable standard frequencies. However, RF signals provided by cable systems may be offset in frequency relative to the standard frequencies for respective channels. To accommodate such offset frequency RF signals, tuner control unit 5 may include provisions for allowing an automatic fine tuning (AFT) signal, representing the deviation of the frequency of the picture carrier of the IF signal from its nominal value, to modify the tuning voltage established by the phase locked loop as is indicated in FIG. 1 by a conductor coupling an AFT signal from IF section 7 to tuner control unit 5. In that case, a switch may be provided for selecting between the broadcast and cable tuning operations of tuner control unit 5.

Thus, EAROM 75 may store data for indicating the:
"autotint" state;
stereo/monaural state;
noise reduction state; and
broadcast/cable state.

The data for a particular state simply comprises either a logic "1" or a logic "0" stored in a respective memory location of EAROM 73. For example, to indicate that the "autotint" function is operative, a logic "1" is stored in a respective memory location and if the "autotint" function is inoperative, a logic "0" is stored in the same memory location. Such 1 bit memory locations are often referred to as "flags" and will be so referred to hereinafter.

Finally, EAROM 75 may store data for certain special features of the receiver. For example, it may store data for the future times the television receiver is to be automatically turned off for a so called "sleep" feature and turned on for an "alarm" feature. EAROM 75 may also have a list of whether each channel that tuner 3 is capable of tuning is desired or not. The list is used to bypass ("skip") those channels which are not desired in a scanning operation. Such skip lists are useful when only a relatively few channels of all the available channels can be received in a given area. If a channel is not to be skipped, a corresponding memory location of EAROM 75 will contain a logic "1". If a channel is to be skipped, the corresponding memory location will contain a logic "0".

Figure 3:
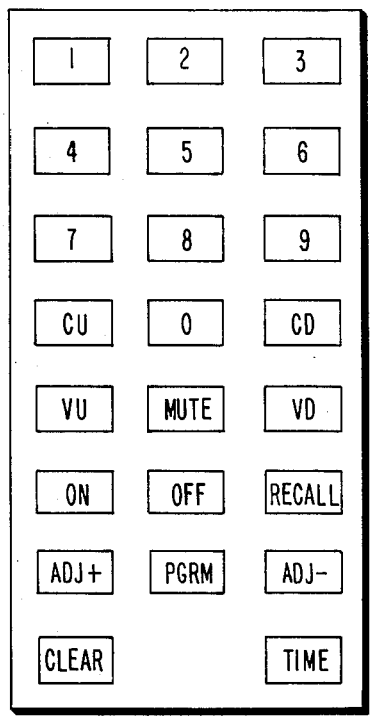
FIG. 3 is a plan view of a keyboard used in the control apparatus shown in FIG. 1.

While there are a relatively large number of functions and characteristics to be controlled as described above, there are only a relatively few pushbutton switches provided on local keyboard 51 or remote keyboard 53 to control these functions. FIG. 3 shows the keys of local keyboard 51 and remote keyboard 53. Each key is associated with a pushbutton switch. The pushbutton switch is normally opened and closed when the respective key is pressed. When the key is released, the switch automatically opens again.

The keyboard includes numbered keys for each one of the digits 0 through 9. The numbered keys are used to select channels by pressing the tens and units digit of the channel number of the desired channel in sequence. The numbered keys are also used to select the various functions and characteristics for control as will be described in detail below.

Channels can also be selected by pressing either a CU (channel up) or CD (channel down) key which causes channels to be successively selected in either increasing or decreasing channel number order until a channel is selected which has a desired indication stored in a respective memory of the skip list portion of EAROM 73.

The keyboard also includes ON and OFF keys for turning the receiver "on" and "off", VU (volume up) and VD (volume down) keys for increasing and decreasing the volume level and a MUTE key for "muting" the audio response.

A recall key is provided for recalling the channel number and time display at will.

A PRGM (program) key is provided for enabling the numbered keys to select the function or characteristic to be controlled as will also be described in detail below.

Once a characteristic has been selected for control, ADJ+ (adjust in positive sense) and ADJ− (adjust in negative sense) can be operated to set the desired level of the selected characteristic. The ADJ+ and ADJ− are also used to program the skip list.

A CLEAR key allows a user to recall all the factory preset characteristics unconditionally. Such a key has been found desirable since with five characteristics that can be adjusted and with there being some subjective interaction between the characteristics, the user may find it difficult to obtain a satisfactory picture after some of five characteristics have been misadjusted, especially to extreme settings.

Finally, a TIME key is provided for setting the sleep and alarm functions.

As earlier explained, on-screen character generator 65 is controlled by microprocessor 49 to display instructions for guiding the user to use the relative few keys of the keyboard shown in FIG. 3 to control the relatively large number of functions and characteristics of the receiver previously described. Specifically, according to the present invention, this entails causing a numbered list or menu of control functions to be displayed when the PGRM key is pressed and thereafter enabling a function to be controlled when the correspondingly numbered digit key is pressed. If the function includes a plurality of characteristics or subfunctions, pressing a digit key corresponding to one of the functions on the displayed function control menu causes a numbered list or menu of characteristics or subfunctions to be displayed. Thereafter, a particular characteristic on the displayed characteristic control menu can be selected for control, by means of the ADJ+ and ADJ− keys, by pressing the correspondingly numbered digit key.

This menu type of control apparatus is advantageous since it is easier for the user to look at the screen of the picture tube to select the function or characteristic to be controlled than to search a keyboard with a large number of keys for the appropriate key. It also easily allows for future expansion of functions and characteristics to be controlled without changing the keyboard. Thus, a remote control transmitter may be used for several generations of receivers without modification.

The interactive use of the keys on the keyboard shown in FIG. 3 and the function and characteristic control menus will now be described in detail with reference to the flow chart of the control program for microprocessor 49 shown in FIGS. 4a–4o. The numbers in brackets in the following description refer to correspondingly numbered operations indicated in the flow chart.

Figure 4A:
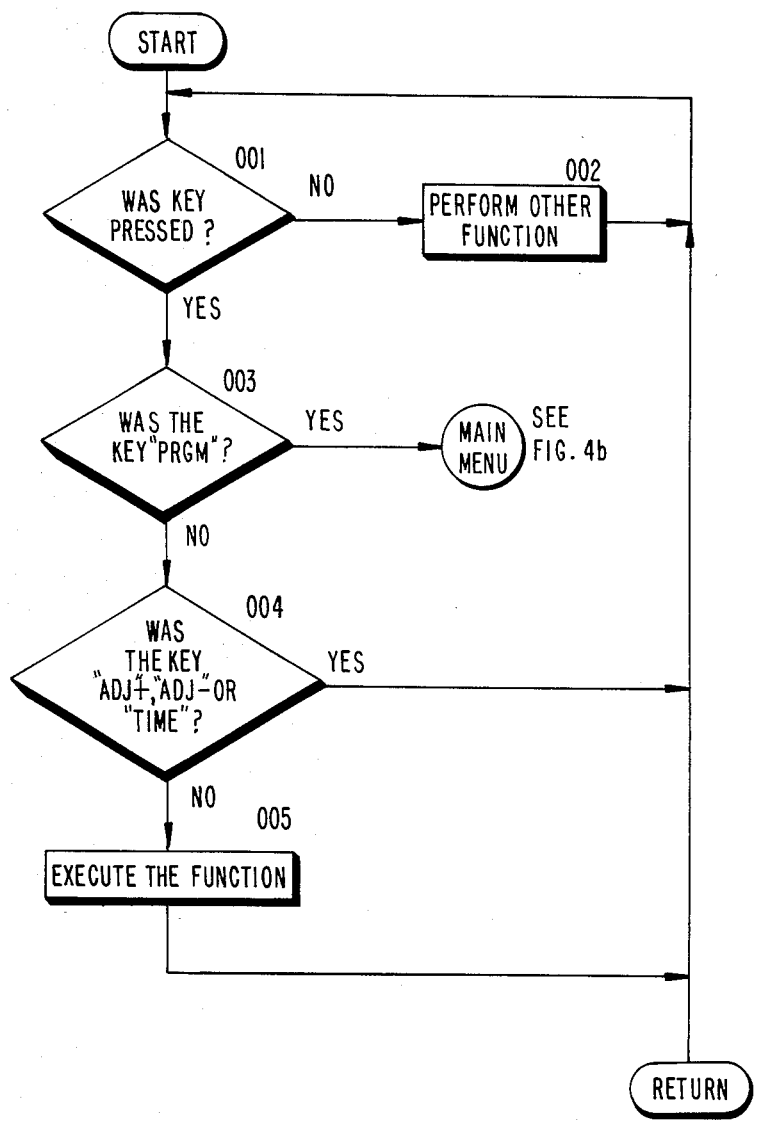
FIGS. 4a–4o are flow charts of various portions of the program for the microprocessor shown in FIG. 2 for controlling the function control apparatus shown in FIG. 1.

With reference to FIG. 4a, microprocessor 49 performs routine functions, such as keeping track of the present time by updating the contents of an internal counter in response to cycles of a clock signal or the AC line voltage, until a key of local keyboard 51 or remote keyboard 53 is pressed [001,002]. When a key is pressed, the key is examined to determine what action is to be taken next [003,004]. If the pressed key was one other than the PGRM, ADJ+, ADJ− or TIME keys, the corresponding function, such as tuning the receiver on or off, selecting a channel or controlling the volume level, is executed [005]. If the pressed key was the ADJ+, ADJ− or TIME key, the entry is ignored [004] since these keys are used only after a function or characteristic has been selected for control as will be described below. If the pressed key was the PGRM key, a portion of the program shown in FIG. 4b is initiated [003] for selecting a function to be controlled.

Figure 4B:
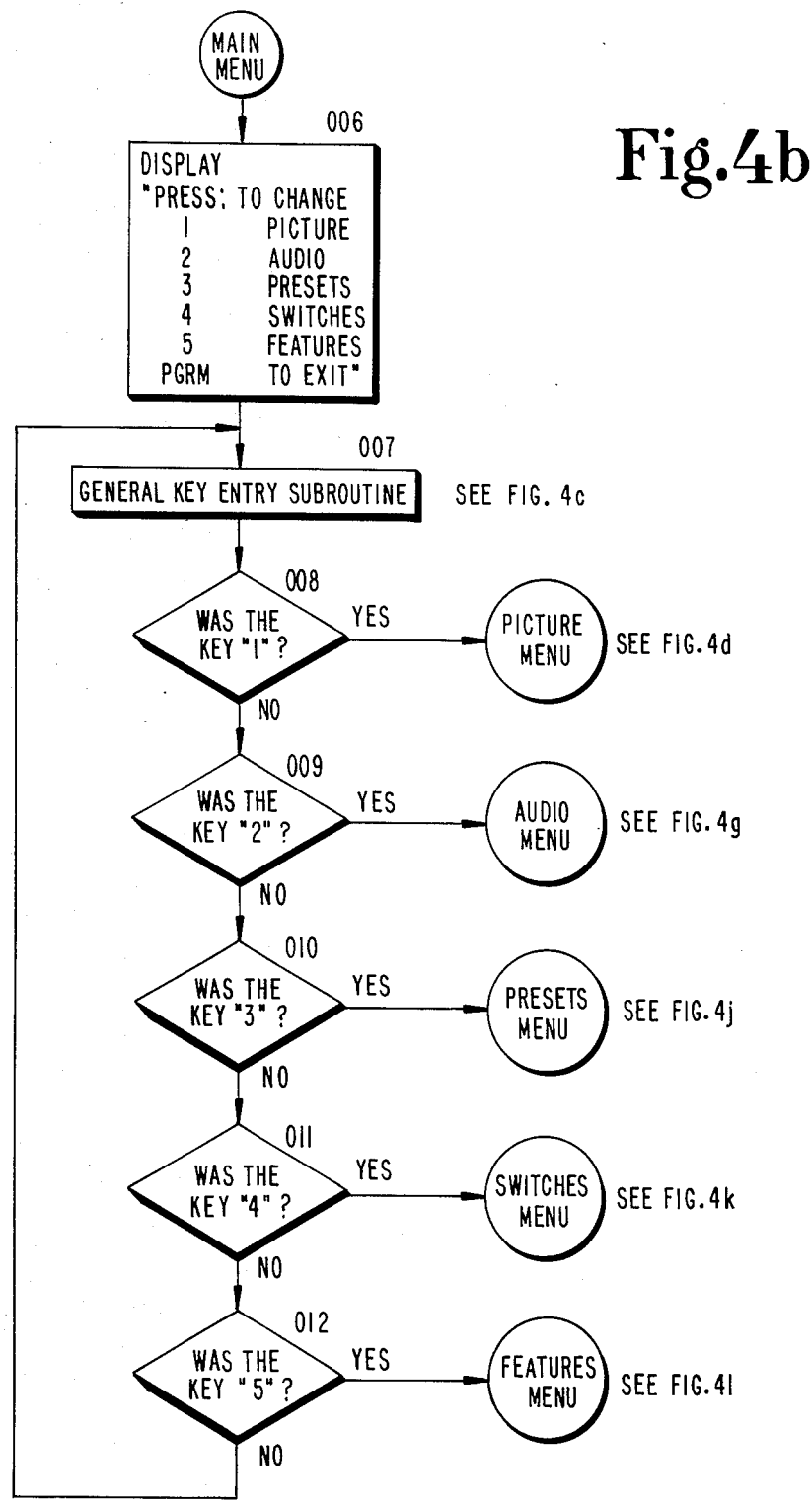

With reference to FIG. 4b, after the PGRM key has been depressed, character generator 65 is caused to display a numbered list or menu of the various functions that can be controlled [006]. This prompts the user to select one of the numbered functions for control by pressing the correspondingly numbered digit key. Accordingly, a key entry subroutine shown in FIG. 4c is initiated [007] to wait for a key entry.

Figure 4C:
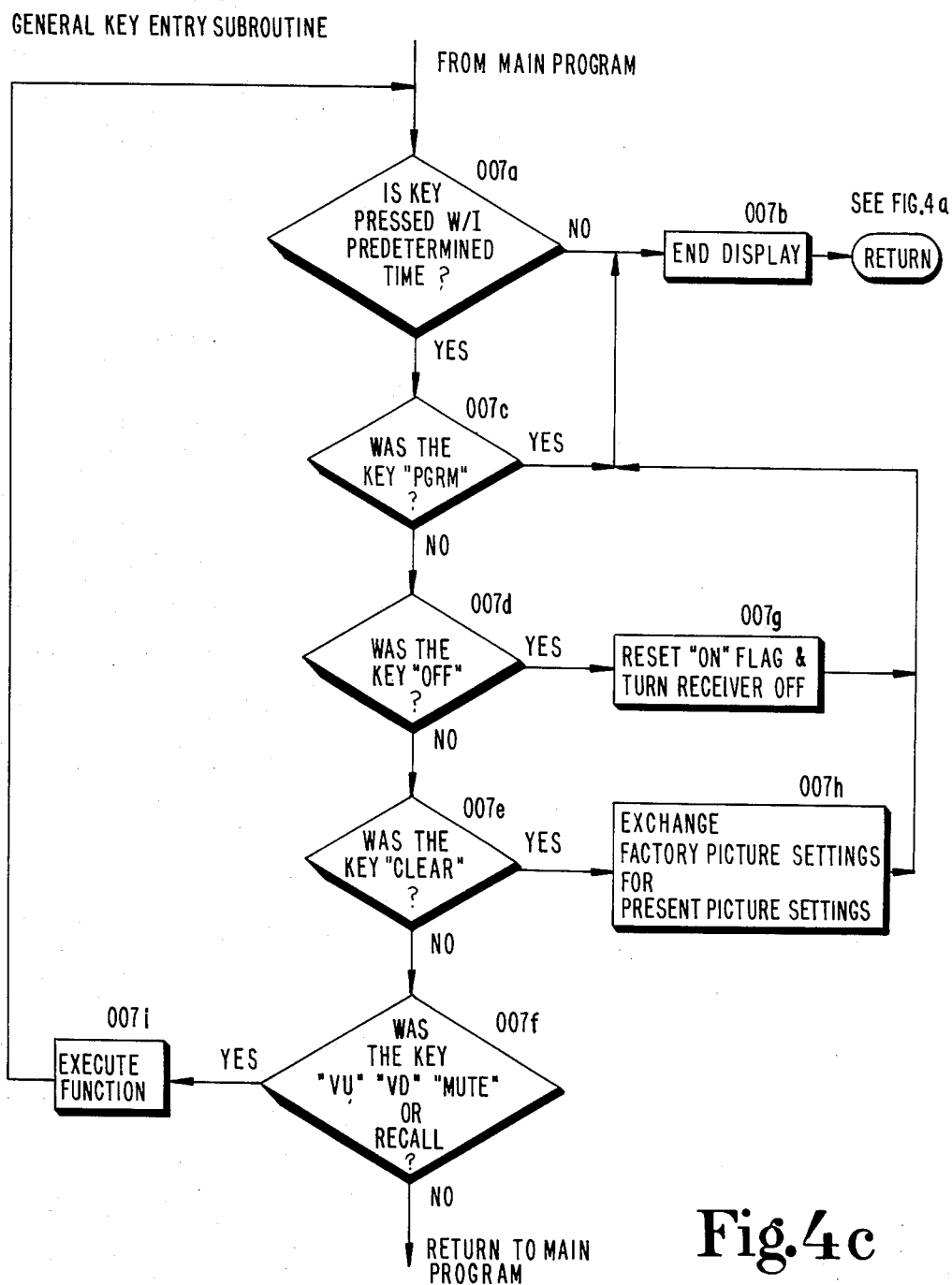

With reference to FIG. 4c, if a key is not pressed within a predetermined time, the function menu display is ended, the function selection menu is ended and the receiver is returned to normal operation [007a,007b]. If a key is depressed within a predetermined time, the pressed key is examined to determine what action is to be taken next [007c,007f]. The user can intentionally end the function control mode by pressing the PGRM key [007c]. The function control mode is also ended if certain other keys are pressed. Pressing the OFF key causes the receiver to be turned off [007d,007g]. Since the CLEAR key is used to return the picture characteristics to their factory preset conditions unconditionally, it is in essence an escape key, and as such, pressing it causes the function control mode to end also [007e,007h]. Certain functions can be unconditionally controlled during the function control mode. These include controlling the volume level muting the sound, and recalling the channel number and time display [007f,007i]. In a case where character generator 65 can produce only a limited number of lines of characters, pressing the RECALL key can be made to end the function control mode and thereby the menu display to avoid exhausting the limited capacity of character generator 65 to display both the function menu and the channel number and time display.

If the function control mode has not been ended as described above with reference to FIG. 4c, the program returns to the portion indicated in FIG. 4b, to determine which function, if any, is to be selected by determining if a digit key corresponding to one of the numbered functions on the displayed function control menu was pressed. If a digit key corresponding to a function on the function menu was depressed, the corresponding portion of the program is initiated to control the selected function [008–012]. If a key other than a digit key corresponding to a function on the menu is pressed, its operation is ignored.

Figure 4D:
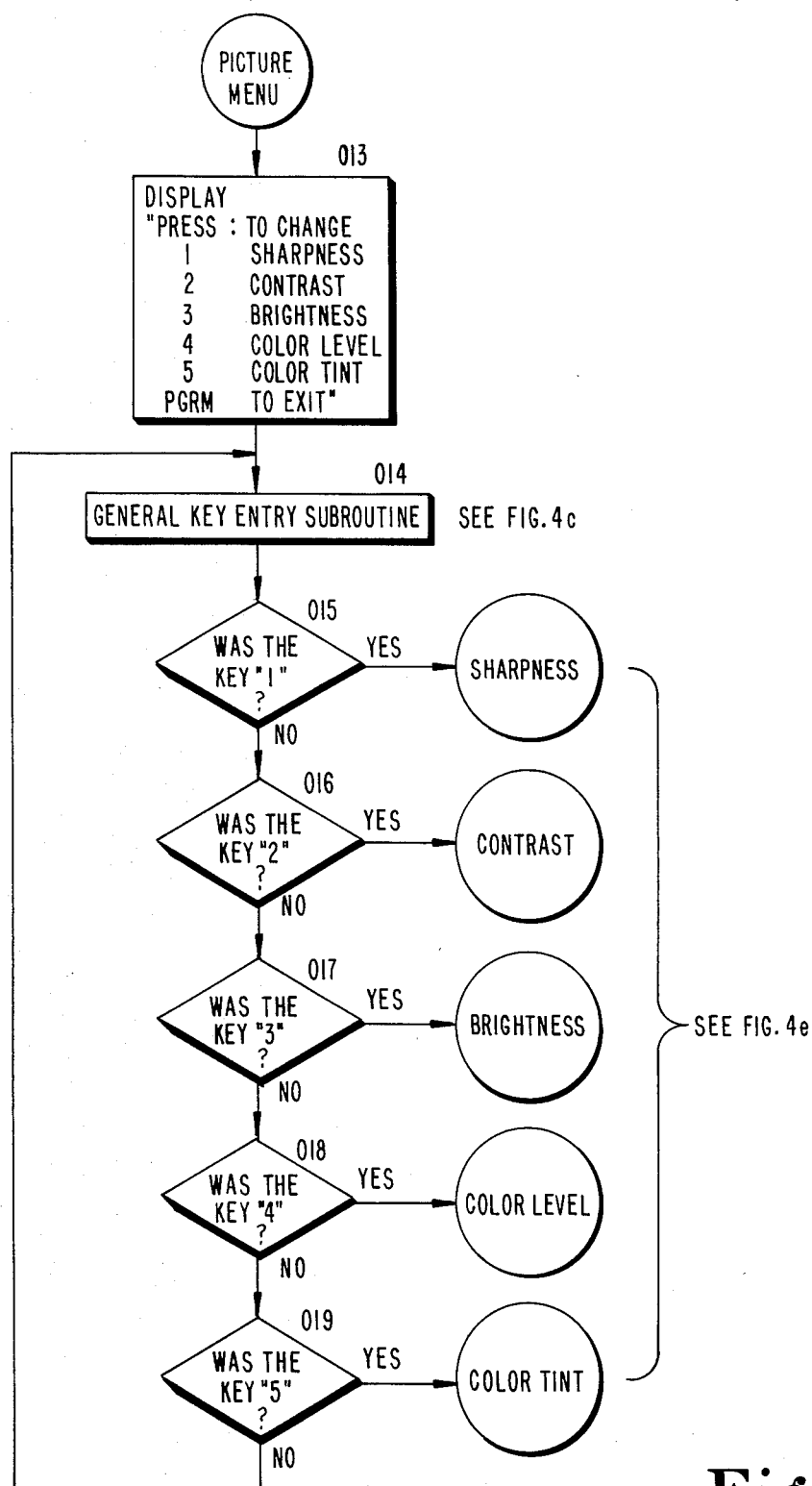

If while the function control menu is displayed the "1" digit key is depressed, as is indicated in FIG. 4d, the picture control function is initiated by causing a numbered list of picture characteristics to be displayed [013]. This prompts tthe user to select a particular numbered characteristic on the displayed characteristic control menu for control by pressing the correspondingly numbered digit key. As in the case of the function control menu, the keyboard entry subroutine is utilized [014] before an examination is made to determine if a digit key corresponding to a numbered digit key was pressed [015,019]. The keyboard entry subroutine is utilized in order to end the characteristic control mode if a key is not pressed in a predetermined time or if the PGRM, OFF or CLEAR keys were pressed and to execute the volume and recall functions to be unconditionally executed if the VU, VD, MUTE or RECALL keys were pressed.

By way of example, the portion of the program for adjustment of the sharpness characteristic of the picture initiated when the "1" digit key is pressed while the picture characteristic menu is displayed will now be described with reference to FIG. 4e. The portions of the program for adjustment of the contrast, brightness, color level and color tint characteristics of the picture are similar. During the adjustment, a scale with a "—" sign at one end and a "+" sign at the other end and with an index indicating the present sharpness level is displayed [020]. This prompts a user to press the ADJ+ key or the ADJ— key to change the adjustment level as desired. The data word stored in the memory location of EAROM 75 associated with the sharpness level is either increased or decreased in value depending on which one of the ADJ+ key or ADJ— key is pressed and thereafter coupled through communications bus 59 to luminance processor unit 13 [022-025]. In addition, the position of the index is correspondingly updated [020].

Figure 4E:
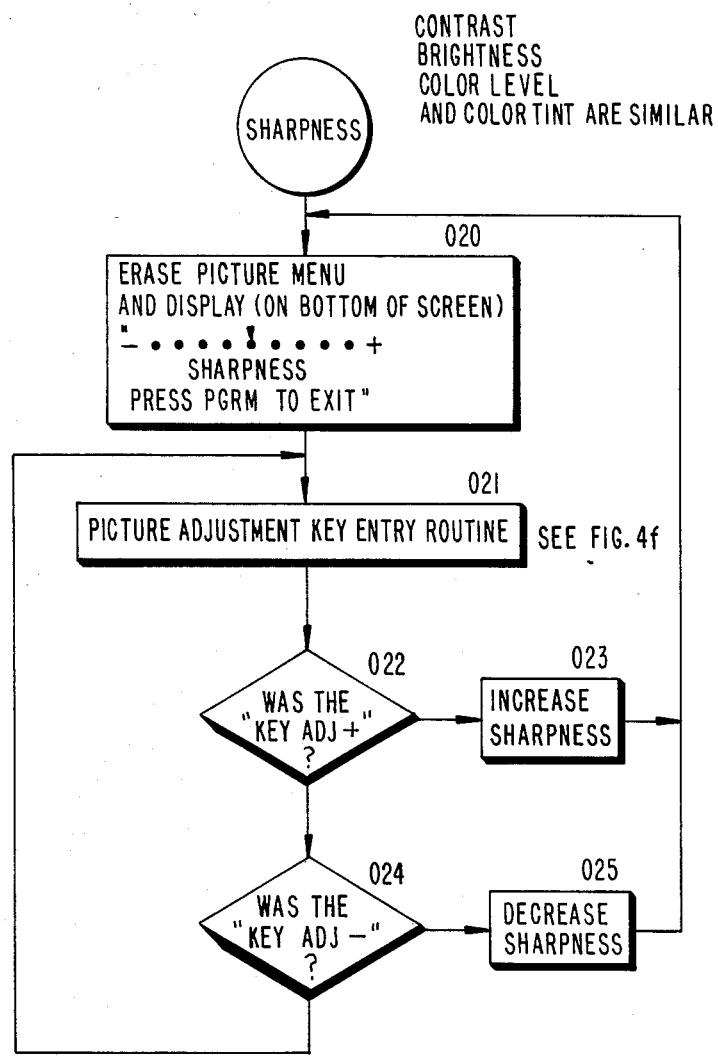
Figure 4F:
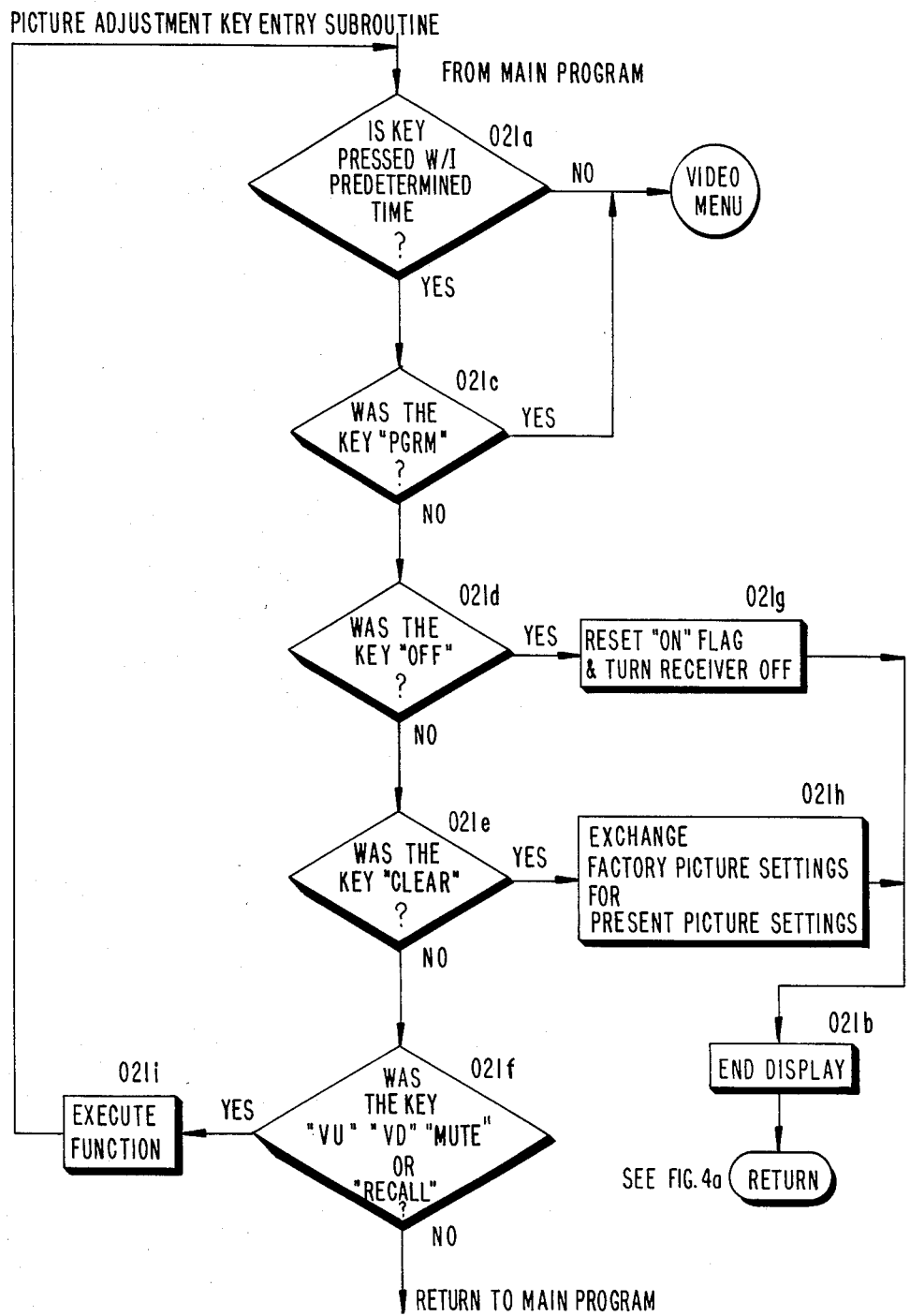

As is indicated in FIG. 4e, during the adjustment of a picture characteristic, a picture adjustment key entry subroutine is initiated. The picture adjustment key entry subroutine, indicated in FIG. 4f, is similar to the general adjustment key entry subroutine previously described, and is utilized to end the adjustment mode of operation if a key is not pressed with a predetermined time [021a] or if the PGRM key was pressed [012c]. However, in this case, instead of returning the receiver to normal operation, the picture characteristic control menu is caused to be displayed again. This is because it is assumed that after one picture characteristic has been adjusted, the user may wish to adjust another picture characteristic since these characteristics are somewhat subjectively interactive. The remaining portions of the picture adjustment key entry subroutine [021b,021d-021i] are the same as the corresponding portion of the general key entry subroutine as indicated in FIG. 4c.

Figure 4G:
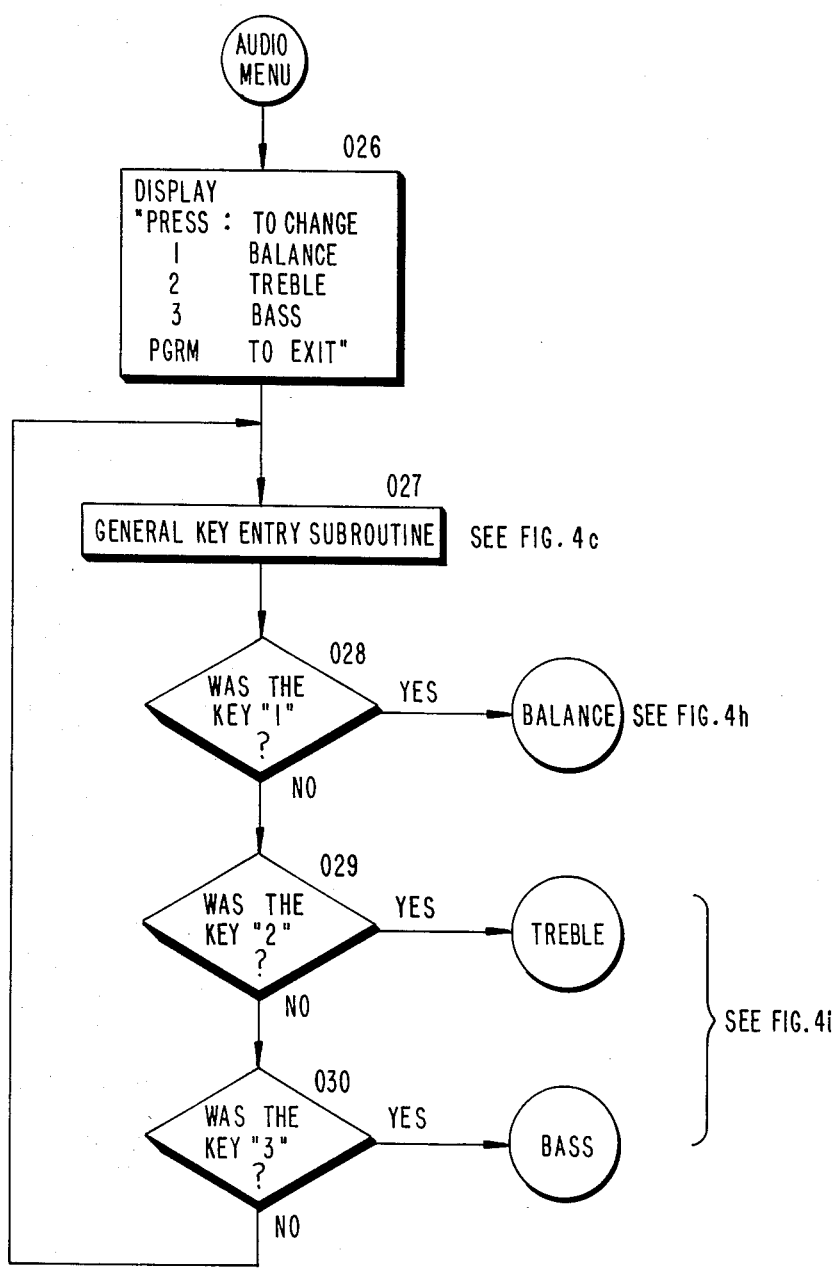
Figure 4H:
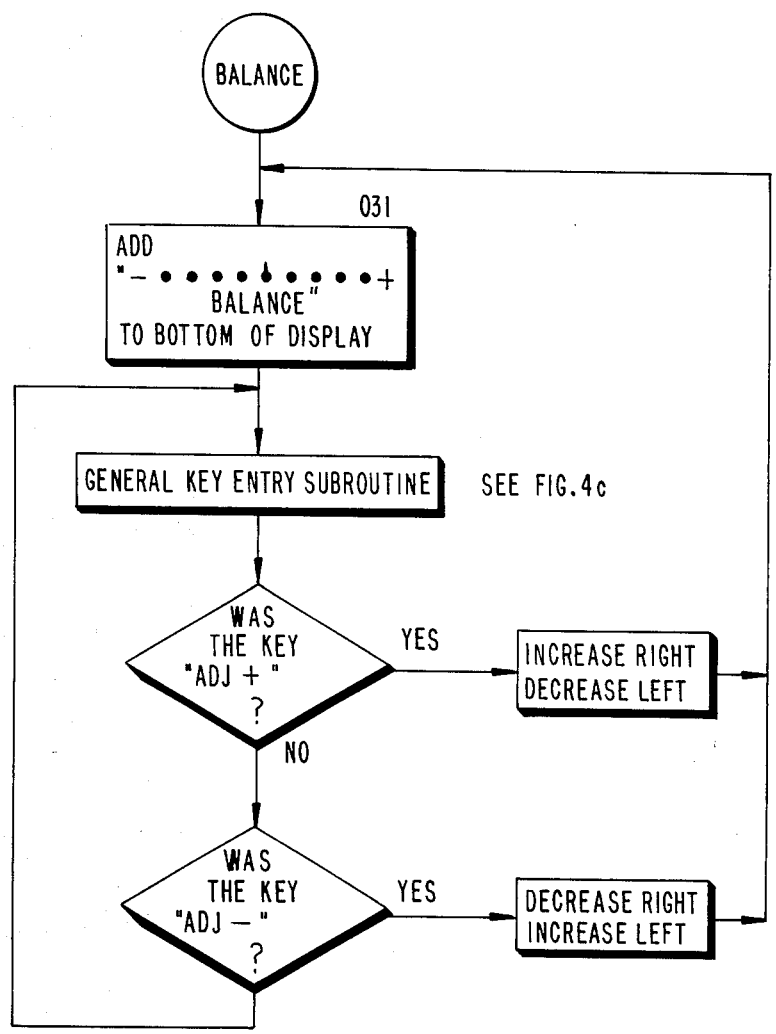
Figure 4I:
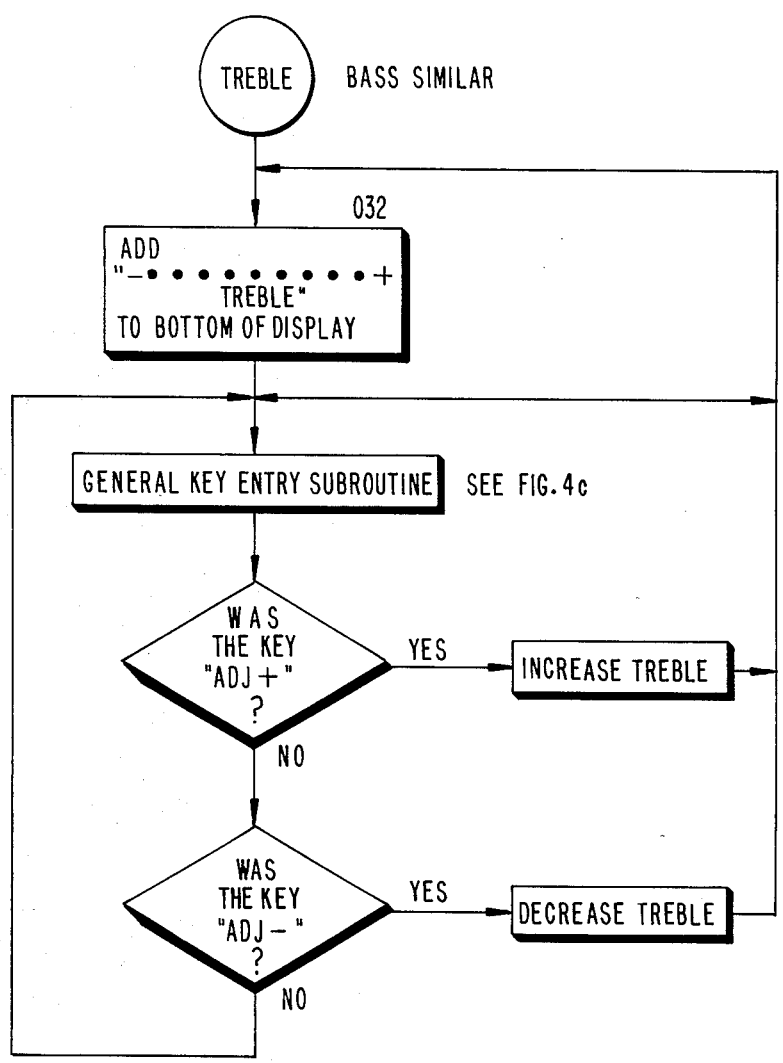

If the "2" digit key is pressed while the function control menu is displayed, as is indicated in FIG. 4g, a numbered list or menu of audio characteristics is displayed [026] A particular audio characteristic may be selected for adjustment by pressing a respectively numbered digit key [027-030]. The various audio adjustment routines are indicated in FIGS. 4h and 4i and are similar to the picture adjustment routines, except that the audio characteristic menu is displayed together with the adjustment scale thus allowing the user to select another audio characteristic for adjustment after the adjustment of one audio characteristic [031 of FIG. 4h and 032 of FIG. 4i]. While the same type of display may be used for the adjustment of the picture characteristics, since there are more picture characteristics than audio characteristics, depending on the particular character generator used as character generator 65, there may not be enough lines of display available for this purpose.

Figure 4J:
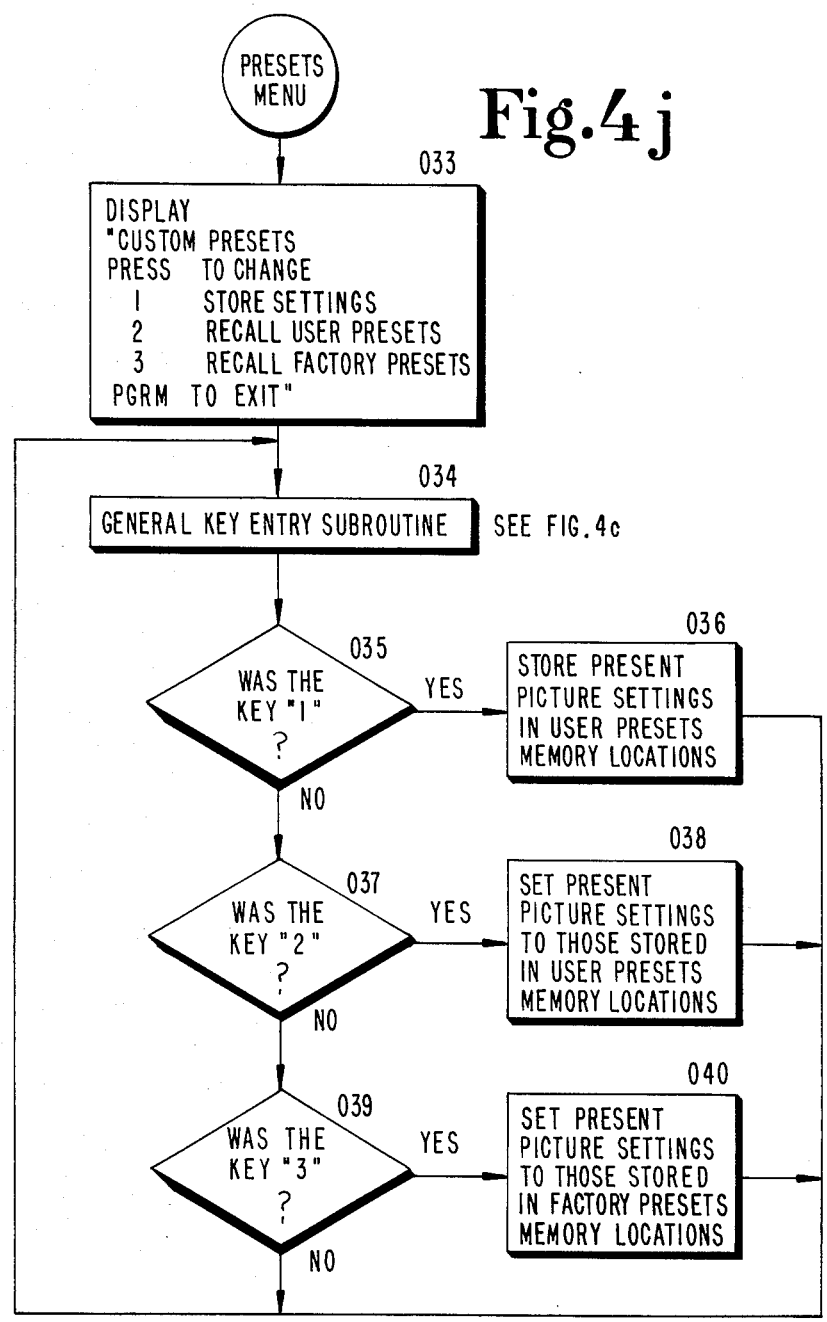

If the "3" digit key is pressed while the function control menu is displayed, as is indicated in FIG. 4j, a numbered list or menu of the possible preset conditions is displayed [033]. The user can select which of the preset conditions is to be established by pressing correspondingly numbered digit key [034-040]. If the "1" digit key is pressed, the present settings for the picture characteristics of sharpness, brightness, contrast, color level and color tint are stored in respective memory locations of EAROM 75 for the users preferences [035,036] for future recall. If the "2" digit key is pressed, the picture characteristics are set to the user preferences previously stored in respective memory location of EAROM 75 [037,038]. If the "3" digit key is pressed, the picture characteristics are set to the factory settings [039,040].

Figure 4K:
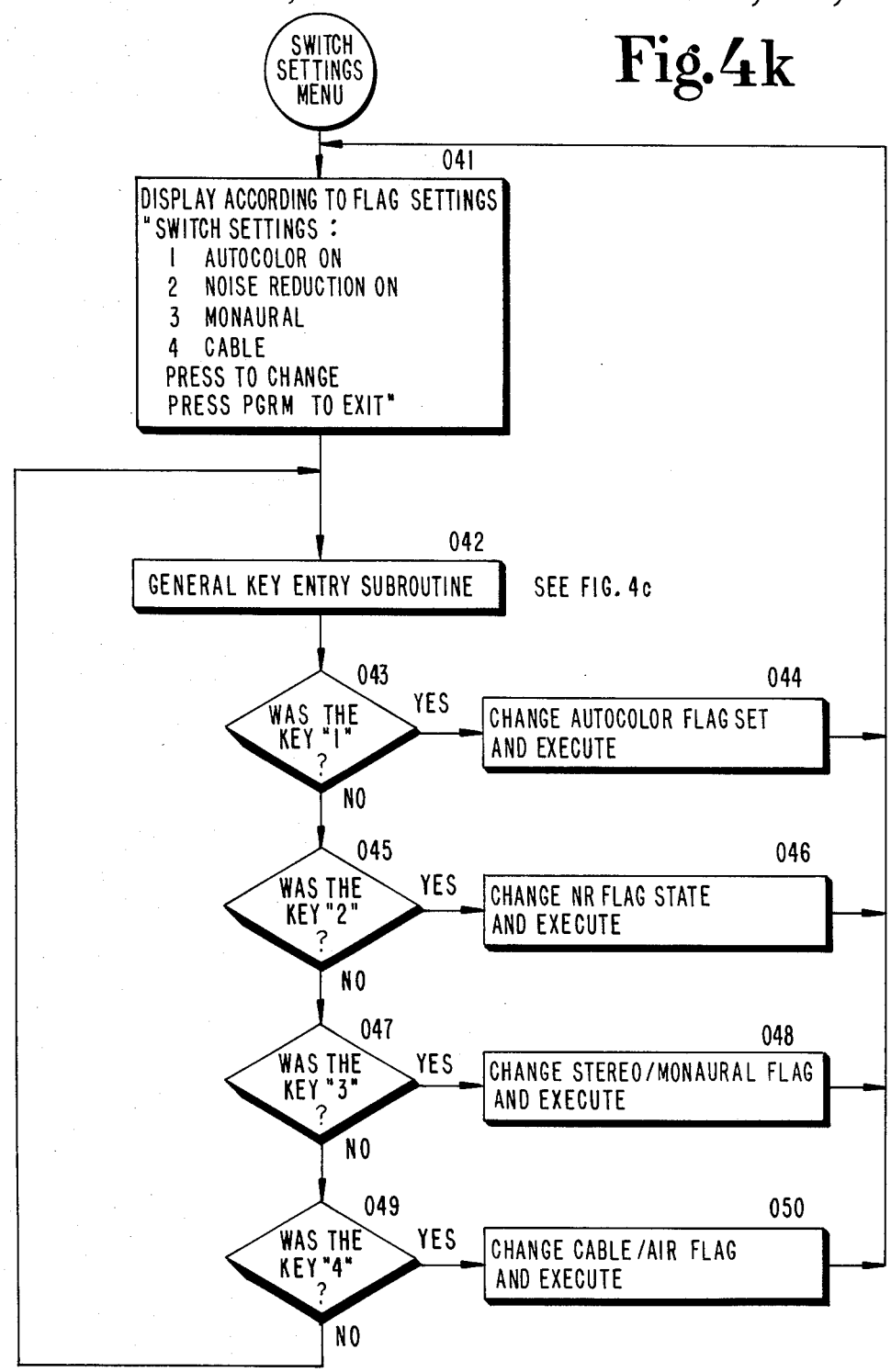

To change the state an operating mode of the receiver normally determined by a mechanical switch in a conventional receiver, the user presses the "4" digit key while the function control menu is displayed. As is indicated in FIG. 4k, this causes a number list of the present switch settings corresponding to the states of various operating modes to be displayed [041]. To change any of these, the user can press the correspondingly numbered digit key which causes the respective flag to be changed accordingly [042-050]. Thereafter, the number list of switch states is updated to reflect the change [041].

Figure 4L:
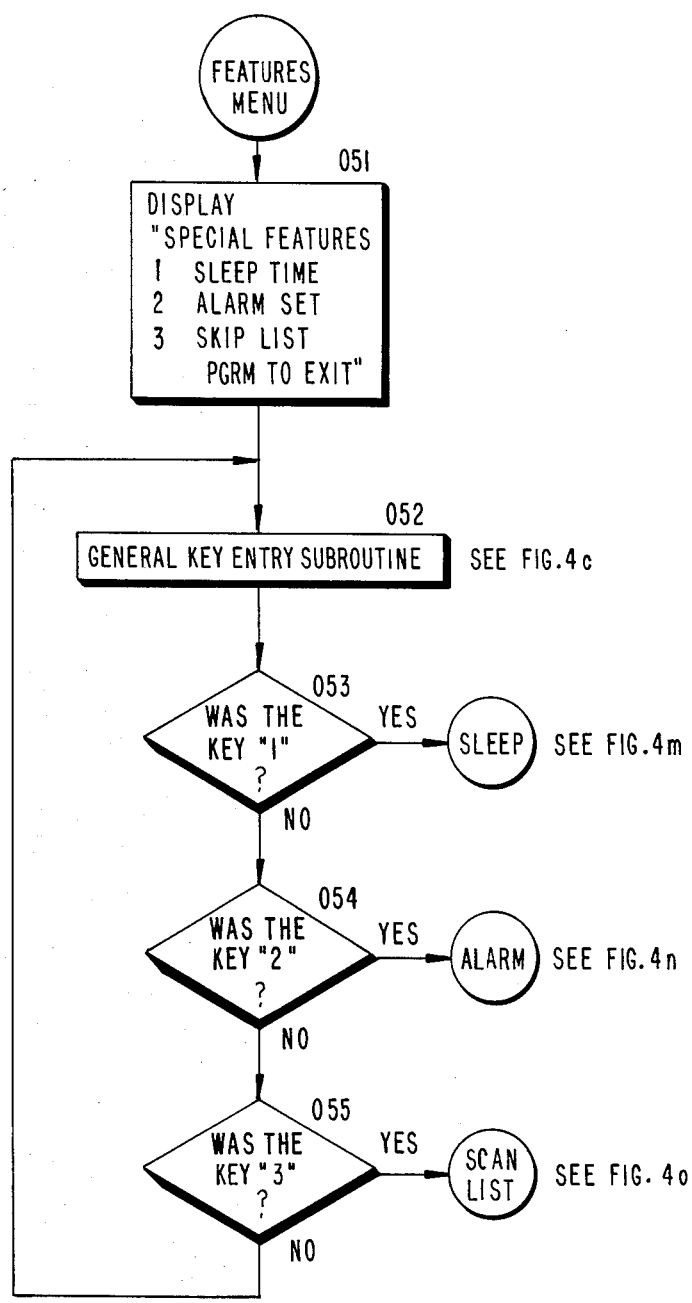

To program a particular "special" feature of the receiver, the user presses the "5" digit key while the function menu is displayed. As is indicated in FIG. 4l, this causes a numbered list of special features to be displayed for selection by pressing the correspondingly numbered digit key [051-055].

Figure 4M:
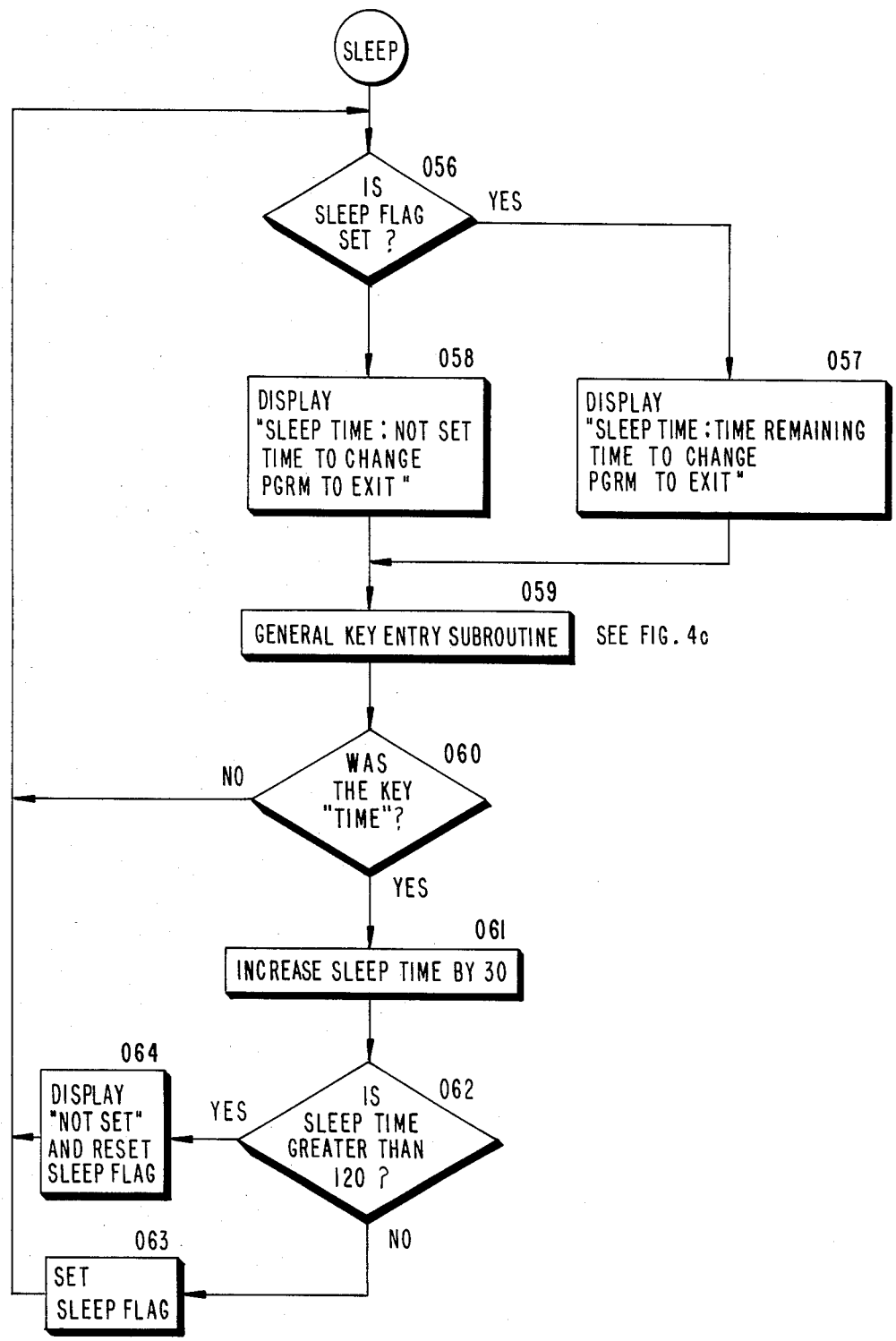

If the "1" digit key is pressed while the special features menu is displayed, the sleep function is enabled to be programmed as is indicated in FIG. 4m. If the sleep function was previously programmed [056], the remaining time before the receiver is to be turned off is displayed [057]. If the sleep function is not set [056], the display indicates that condition and guides a user as to how to set the sleep function [058]. The sleep time may be set in 30 minute increments up to 120 minutes by successively pressing the TIME key [059-063]. The sleep function can be inactivated by successively pressing the TIME key for a sleep time beyond 120 minutes [062,064].

Figure 4N:
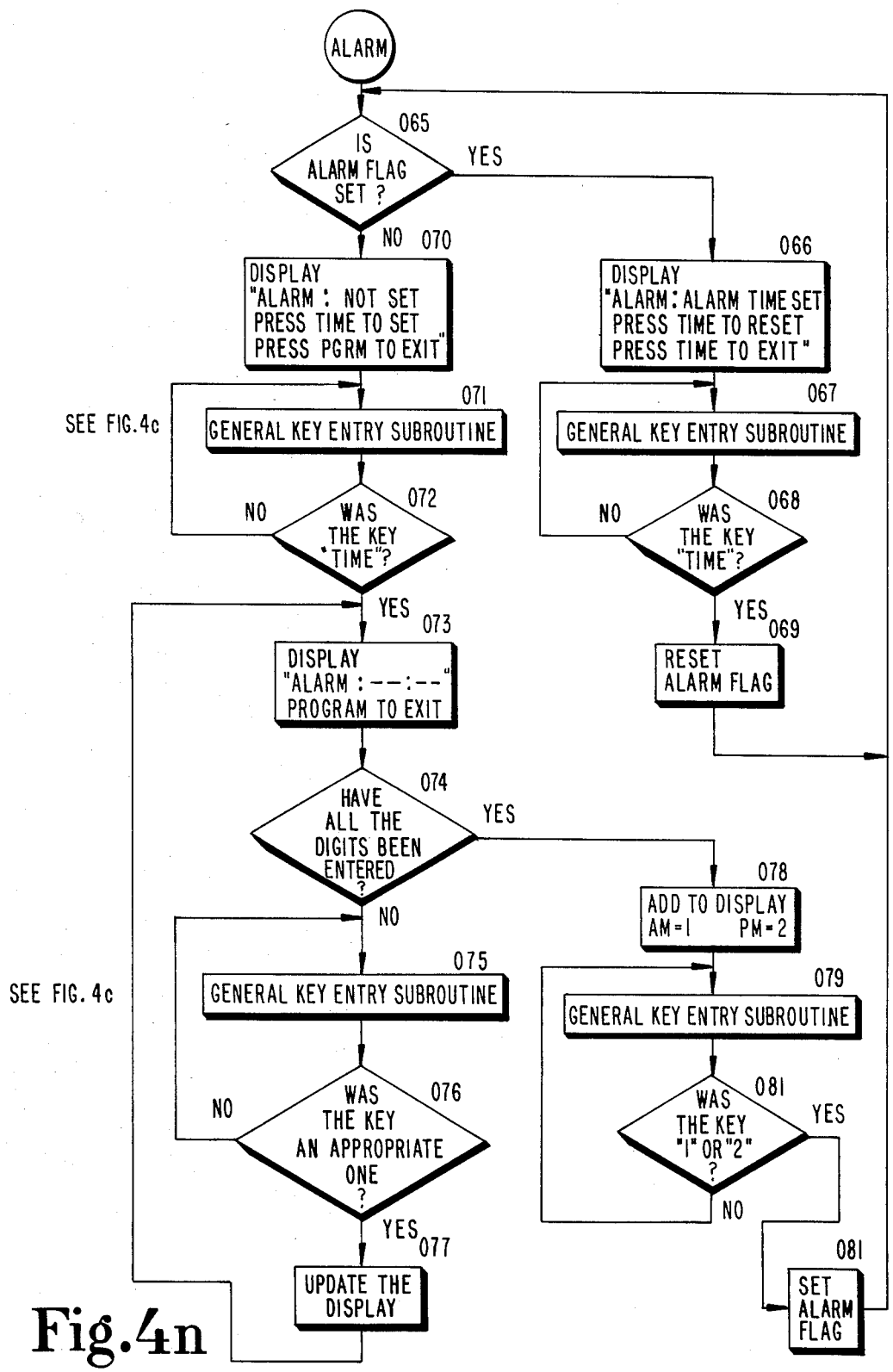

If the "2" digit key is pressed while the special feature menu is displayed, the alarm function is enabled to be programmed as is indicated in FIG. 4n. If the alarm function was previously set, the alarm time is displayed [065,066]. The alarm function can be reset by pressing the TIME key [066-069]. If the alarm is not set, the display indicates that condition [065,070]. The alarm function can be set by pressing the TIME key [070]. This causes a display with blanks corresponding to the digits of alarm time to be produced [071-073]. This prompts a user to enter the appropriate digits until the time is complete [073-077]. Thereafter, the user is prompted by the display to select whether the alarm time is before or after midnight (i.e., AM or PM) [078-080]. When this has been accomplished the alarm function is set [081].

Figure 4O:
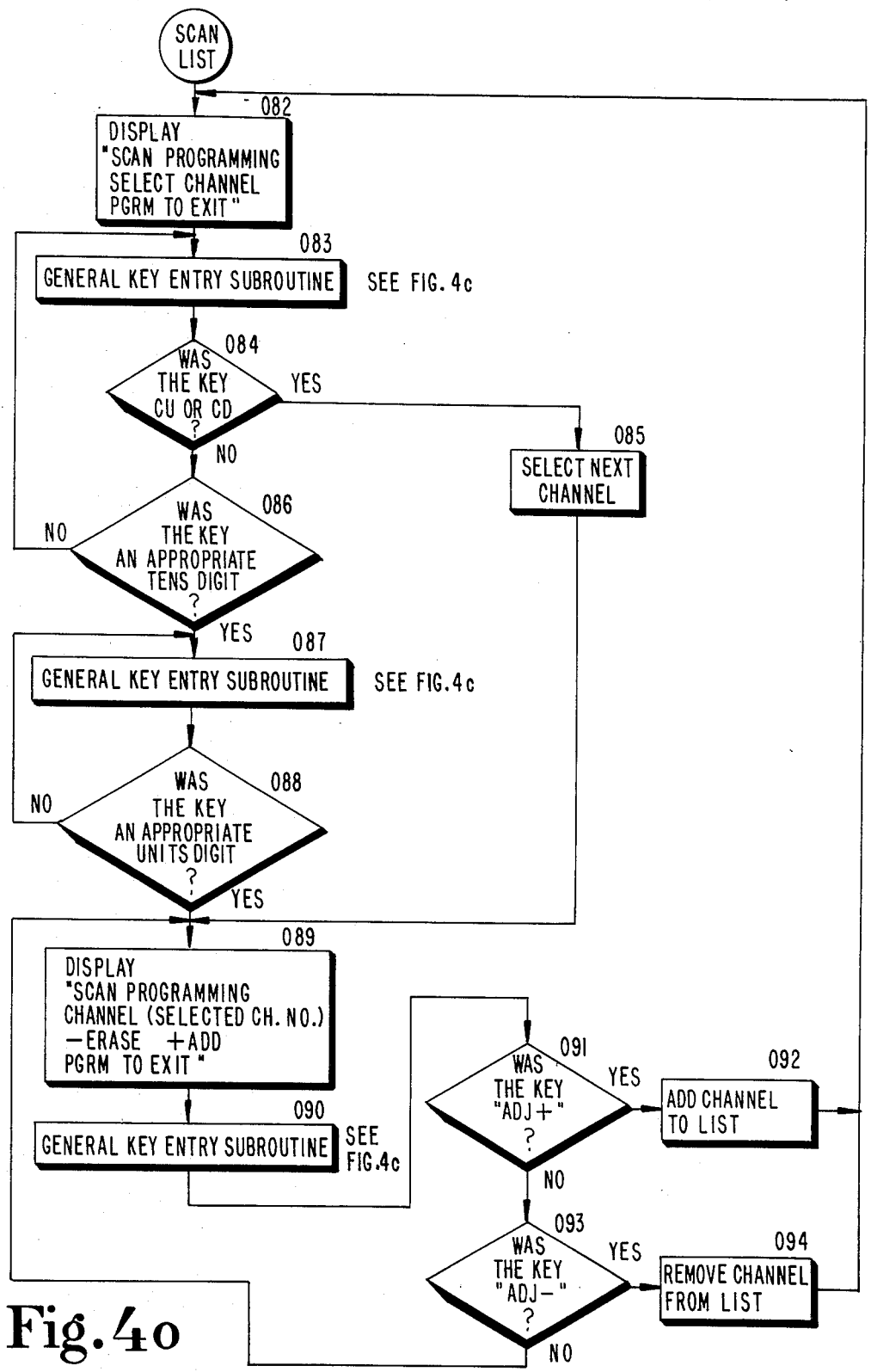

If the "3" digit key is pressed while the special function menu is displayed, the skip list is enabled to be programmed as is indicated in FIG. 4o. First, the display prompts the user to select the channel to be added or deleted from the skip list [082]. The channel selection may be performed by pressing the CU or CD keys or by sequentially pressing the tens and units digit keys [083-088]. Thereafter, the display prompts the user to add or remove the selected channel from the list by pressing the ADJ+ key or the ADJ— key, respectively [089-094].

It will be appreciated that modifications can be made to the described system. For example, while in the described system, ADJ+ and ADJ— are provided to adjust various characteristics if it is desired to omit these keys, to affect a further saving of keys, other keys, such as the CU and CD or two digit keys may be used for this purpose as well as for their normal functions. In addition, while in the described system the numbered digit keys are provided to select RF signals, in a television system, such as a monitor, which receives baseband signals, the numbered switches couled be used to select the baseband signals. Further, while in the described system, numbered switches are used to select the television signal sources, these switches could as well be identified by other symbols such as letters. In that case, the functions and characteristics of switches listed in the various menus would be identified by respective symbols. These and other modifications are intended to be within the scope of the present invention as defined by the following claims.

What is claimed is:

1. In a television system, apparatus comprising:
input means receiving a plurality of television signals for selecting one of said television signals;
signal processing means responsive to said selected television signal for adjusting, when enabled, various signal properties of said selected television signal to produce at least one of a video signal and an audio signal with desired properties;
coupling means for coupling said video signal to an image reproducing device in order to display an image and for coupling said audio signal to a sound reproducing device in order to produce an audio response;
a plurality of user operable numbered switches;
control means coupled to said input means and being normally responsive to the operation of said numbered switches for controlling the selection of one of said television signals;
character generation means coupled to said coupling means for forming alpha-numeric characters on said display device;
a user operable program switch;
said control means also being coupled to said character generation means and to said signal processing means and being responsive to the operation of said program switch for causing the display of a numbered list of functions to be controlled by said signal processing means and thereafter being responsive to the operation of ones of said numbered switches for enabling said signal processing means to adjust respective signal properties.

2. The apparatus recited in claim 1, wherein:
at least one of said numbered list of functions corresponds to the adjustment of a plurality of adjustable characteristics of at least one of said image and said audio response; and
said control means in response to the operation of the numbered switch associated with said one of said functions for the adjustment of said plurality of adjustable characteristics causes the display of a numbered list of said characteristics and thereafter being responsive to the operation of ones of said numbered switches for enabling said signal processing means to adjust respective ones of said displayed numbered characteristics.

3. The apparatus recited in claim 2, wherein:
first and second adjustment switches are provided for adjusting each one of said adjustable characteristics in opposite senses.

4. The apparatus recited in claim 3, wherein:
said signal processing means includes image processing means for processing a video signal derived from said selected television signal to control various adjustable characteristics of said image;
said numbered list of functions includes an image controlling function corresponding to the adjustment of said adjustable characteristics of said image; and
said control means in response to the operation of the numbered switch associated with said image control function causes a numbered list of said adjustable characteristics of said image to be displayed.

5. The apparatus recited in claim 4, wherein:
said signal processing means includes audio processing means for processing an audio signal derived from said selected television signal to control various adjustable characteristics of said audio response;
said numbered list of functions also includes an audio response controlling function corresponding to the adjustment of said adjustable characteristics of said audio response; and
said control means in response to the operation of the numbered switch associated with said audio response control function causes a numbered list of said adjustable characteristics of said audio response to be displayed.

6. The apparatus recited in claim 4, wherein:
said image processing means includes luminance processing means for controlling at least the brightness and contrast characteristics of said image; and chrominance processing means for controlling the color level and color tint characteristics of said image.

7. The apparatus recited in claim 6, wherein:
said luminance processing means also controls the sharpness characteristics of said image.

8. The apparatus recited in claim 4, wherein:
there is provided at least a first storage means for storing a first preset value of one of said characteristics of said image; a second storage means for storing a second preset value of said one of said characteristics; third storage means for storing a present value of said one characteristics; and transfer means for selectively (1) transferring the contents of said first storage means to said third storage means, (2) transferring the contents of said second storage means to said third storage means, or (3) transferring the contents of said third storage means to said first storage means;
said numbered list of functions also includes a transfer selection function for selecting ones of the transfer operation of said transfer means; and
said control means in response to the operation of the numbered switch associated with said transfer control function causes a numbered list of said transfer operations of said transfer means to be displayed.

9. The apparatus recited in claim 8, wherein:
there is provided a user operable recall switch;
said transfer means is responsive to the operation of said recall switch for causing one of said first and second transfer operations of said transfer means to be performed; and
said control means during the display of one of said numbered lists, is responsive to the operation of either one of said program or recall switches to cause said character generation means to end the display of said one numbered list.

10. The apparatus recited in claim 4, wherein:
said signal processing means includes audio processing means for processing first and second stereo signals derived from said selected television signal to control various adjustable characteristics of said audio response;

said numbered list of functions also includes an audio response controlling function corresponding to the adjustment of said adjustable characteristics of said audio response; and said control means in response to the operation of the numbered switch associated with said audio response control function causes a numbered list of said characteristics of said audio response to be displayed.

11. The apparatus recited in claim 10, wherein:
said audio processing means controls at least the balance, treble and bass characteristics of said audio response.

12. The apparatus recited in claim 2, wherein:
said character generation means causes said numbered lists to be displayed at the same time as said image is displayed in response to said video signal.

13. In a television system, apparatus comprising:
input selection means for providing a television signal including luminance and chrominance components from a plurality of television signals;

luminance processing means for processing said luminance component of said television signal to produce a luminance signal having a plurality of controllable characteristics;

chrominance processing means for processing said chrominance components of said television signal to produce a color signal having at least one controllable characteristic;

coupling means for coupling said luminance and color signals to a display device for producing an image corresponding to said selected television signal;

a plurality of numbered switches operable by a user;

control means coupled to said input selection means and normally responsive to the operation of said numbered switches for controlling said input selection means to select a particular television signal;

a program switch operable by a user;

character generating means for generating character signals representative of alpha-numeric characters coupled to said coupling means to thereby display said characters;

said control means being responsive to the operation of said program switch for causing said character generating means to generate character signals for displaying a numbered list of said controllable characteristics of said luminance and chrominance signals and thereafter enabling the appropriate one of said luminance and chrominance processing means to control a given characteristic in response to the operation of a numbered switch corresponding to said given characteristic.

14. The apparatus recited in claim 13, wherein:
said input means receives a plurality of RF television signals and includes tuning means for selecting a particular RF television signal and converting said selected RF signal to an IF signal.

15. The apparatus recited in claim 13, wherein:
said luminance processing means controls the brightness and contrast characteristics of said luminance signal;

said chrominance processing means controls the color level characteristic of said color signal.

16. The apparatus recited in claim 15, wherein:
said luminance processing means also controls the sharpness characteristics of said luminance signal.

17. The apparatus recited in claim 15, wherein:
said chrominance processing means also controls the color tint characteristic of said color signal.

18. The apparatus recited in claim 13, wherein:
said character generating means causes said numbered list to be displayed at the same time said image is displayed in response to said luminance and chrominance signals.

19. In a television system, apparatus comprising:
input selection means for selecting one television signal including luminance, chrominance and audio signal components from a plurality of television signals;

signal processing including luminance processing means for controlling, when enabled, at least one signal property of said luminance signal component, chrominance processing means for controlling, when enabled, at least one signal property of said color signal component, and audio processing means for controlling, when enabled, at least one signal property of said audio signal component;

video coupling means for coupling said luminance and color signals to an image reproducing device to produce an image;

audio coupling means for coupling said audio signal to a sound reproducing device to produce an audio response;

a plurality of user operable switches identified by respective symbols;

control means coupled to said input selection means and normally responsive to the operation of said switches identified by said symbols for controlling said input selection means to select a particular one of said television signals;

a user operable control initiating switch for initiating the control of said characteristics;

character generation means for generating character signals representing characters coupled to said video coupling means to thereby display said characters;

control means coupled to said character generation means and being responsive to the operation of said control initiating switch to cause said character generation means to generate character signals for displaying a list of functions to be controlled by ones of said signal processing means, each of said listed functions being identified by a respective one of said symbols, and thereafter being responsive to the operation of ones of said switches identified by said symbols displayed on said list to enable ones of said processing means to control respective ones of said properties.

20. The apparatus recited in claim 19, wherein:
at least one of said processing means includes a plurality of characteristic control means for adjusting respective ones of a plurality of adjustable characteristics of the respective signal processed by said one processing means; and said control means is reponsive to the enabling of the said one of said processing means to be controlled for causing said character generation means to generate character signals for displaying a list of said plurality of adjustable characteristics, each of said characteristics being identified by a respective one of said symbols, and thereafter is responsive to the operation of said switches identified by said symbols displayed on said list to enable ones of said characteristic control means to adjust respective ones of said plurality of characteristics.

21. The apparatus recited in claim 19, wherein:

said character generation means causes said characters to be displayed at the same time said imge is displayed in response to said luminance and color signals.

22. A television system, comprising:

a display device;

input means for deriving a video signal from a selected one of a plurality of television signals;

video signal processing means coupled to said display device for processing said video signal and coupling it to said display device to produce an image, said video signal processing means selectively adjusting predetermined properties of said video signal corresponding to respective characteristics of said image;

first switch means operable in a first mode for controlling said input means to select one of said television signals;

alpha-numeric signal generating means coupled to said display means for selectively generating alpha-numeric character-representative signals; and second switch means coupled to said alpha-numeric signal generating means and to said signal processing means for (a) causing said display means to display a menu associating said first switch means to a plurality of video signal control functions; and (b) enabling said first switch means to operate in a second mode for selecting a video signal control function from said menu by conditioning said video signal processing means to adjust the property of said video signal dependent on the operation of said first switch means.

* * * * *